May 14, 1946.  W. L. ZINK ET AL  2,400,145
HITCH
Filed Oct. 7, 1940
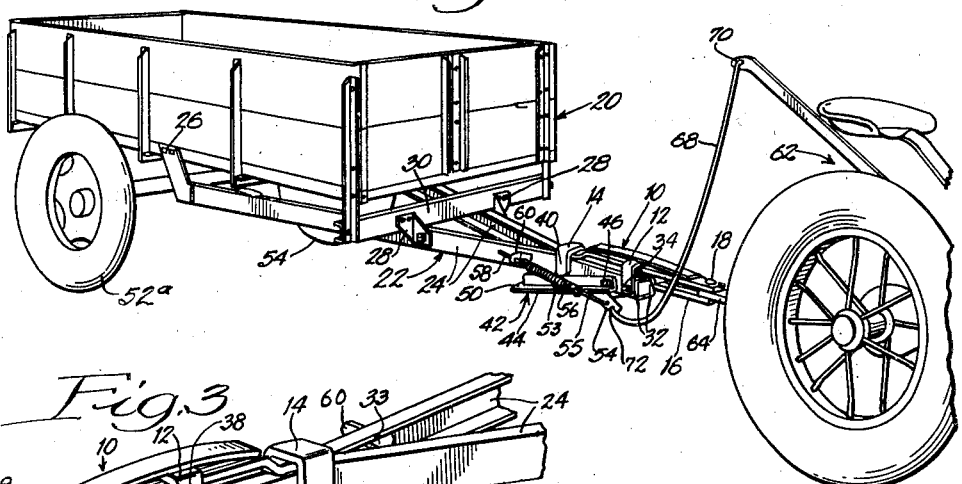
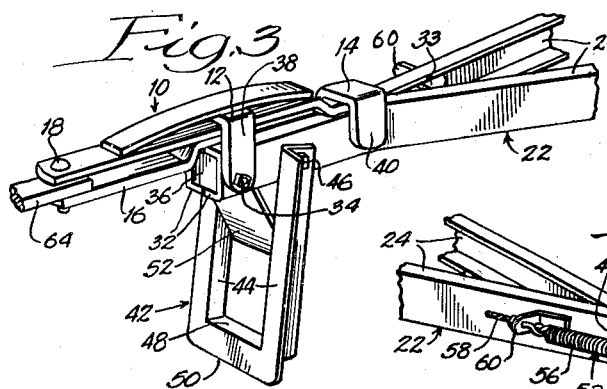
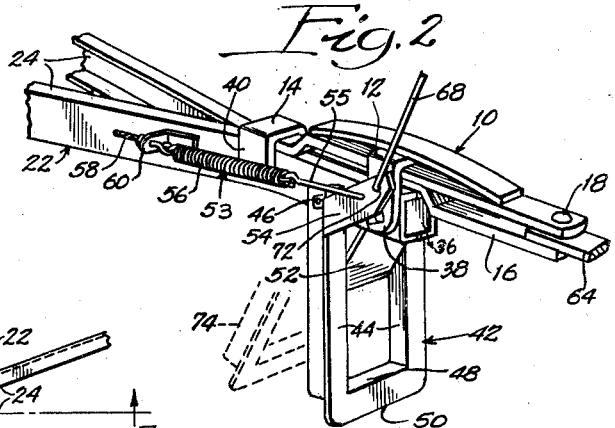
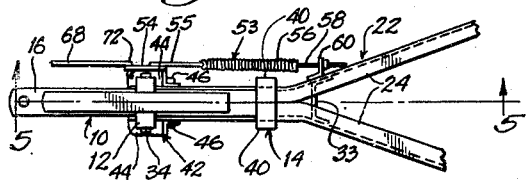
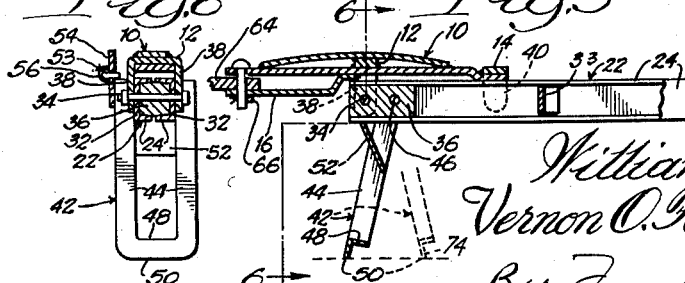
Inventors:
William L. Zink and
Vernon O. Hauswirth,
By Frank H. Marks
Attorney.

Patented May 14, 1946

2,400,145

UNITED STATES PATENT OFFICE 2,400,145

HITCH

William L. Zink, Plano, and Vernon O. Hauswirth, Kankakee, Ill., assignors to Sears, Roebuck and Co., Chicago, Ill., a corporation of New York Application October 7, 1940, Serial No. 360,018

19 Claims. (Cl. 280—33.4)

This invention relates to hitches and more particularly to those for connecting trailers to power driven or other tractive means.

An object of our invention is to provide an improved hitch for a two-wheeled or other unstable trailer.

Another object is to provide a construction of the type referred to affording means for facilitating hitching and unhitching.

It is also an object to provide means to support the trailer in hitching position while it is being hitched to or unhitched from the tractor.

Still another object is to provide a support of the character referred to which may be moved into operative position by the driver on the tractor when it is desired to unhitch the tractor, and also automatically movable into inoperative position after the tractor has been hitched.

A further object is to provide a hitch of the character mentioned of simple and durable construction and improved efficiency, involving few parts, all of which may be manufactured at low cost and readily assembled and disassembled and enable the drawn and tractive devices to be readily coupled and uncoupled.

Further objects and advantages of the invention will appear as the description proceeds.

Fig. 1 is a fragmentary perspective view showing a trailer hitched to a tractor in accordance with our invention.

Fig. 2 is a fragmentary elevation of the hitch portion of Fig. 1, with the stand engaging the ground.

Fig. 3 is a fragmentary perspective view of the arrangement of Fig. 2 but taken from the opposite side.

Fig. 4 is a fragmentary top plan view of the structure appearing in Fig. 3.

Fig. 5 is a fragmentary sectional view taken as indicated by the line 5—5 in Fig. 4.

Fig. 6 is a sectional view taken as indicated by the line 6—6 in Fig. 5.

In accordance with our invention there is provided a lever 10 which may be made in one piece or may be formed of a plurality of steel or other suitable members welded, riveted and/or otherwise joined, affording an intermediate yoke 12 and a rear yoke 14, both preferably opening downward, and a forwardly open yoke or hitch clevis 16 having alined holes to receive a hitch pin 18.

The lever 10 may be supported from the trailer 20, which may be of any suitable character having its front heavier than its rear, and may have a pole 22 in the form of a pair of channel or other suitable bars 24 mounted as at 26 on the sides of the trailer and as at 28 on a front frame member 30 of the trailer, the forward end portions 32 of the bars being juxtaposed. The portions 32 may be braced as by a bracket 33 and held together by a pin 34 extending through the portions 32 and a spacer 36 therebetween, said pin also passing through the arms 38 of the yoke 12, whereby the lever 10 is pivoted to the pole 22. The arms 40 of the yoke 14 are arranged to straddle the pole whereby the pivot pin 34 is assisted in guiding the lever in its pivotal movement.

A preferably U-shaped stand 42 has its arms 44 pivotally connected to the pole 22 by means of a pin 46 passing through the spacer 36, the bight 48 of the stand being preferably sharp as at 50 to dig or grab into the ground. The arms 44 are traversed by a bridge 52 arranged to engage the bottom of the pole 22 as shown in Figs. 2, 3, 5 and 6 to prevent the stand from collapsing forward under the pole, and to permit the part 50 of the stand 42 to engage the ground in advance of the intersection of the ground with an arc which passes through the pivot pin 34 and whose center is at the axis of the wheels 52a supporting the trailer, whereby the action of gravity on the pole insures the stability of the stand.

The stand 42 is connected to the pole 22 by an over-center or toggle arrangement 53 which may comprise a bracket 54 on the stand, a spring hook 55 and a spring 56 adjustably connected as at 58 with a bracket 60 on the pole. The spring holds the stand selectively in an inoperative retracted position as shown in Fig. 1 and in the operative position shown in the other figures. In the latter function the spring cooperates with gravity when the stand is resting on the ground.

The tractor 62, which may be of any suitable type, is provided with a draw bar 64 adapted to be detachably hitched to the clevis 16 by the hitch pin 18. A cotter pin 66 may cooperate with the pin 18 to removably retain it in place.

When the trailer is unhitched, its fore end may be supported by the stand 42 as shown. To hitch the trailer while so supported to the tractor, the operator backs up the tractor until its draw bar 64 is in a position where it is adapted to be placed in the clevis 16 and receive the hitch pin 18. The lever 10 may be swung about its pivot 34 if necessary to enable the draw bar to be properly positioned for the attachment of the hitch pin. Thereafter, as the tractor moves forward, the stand, retarded by the ground, causes the pole 22 to rise slightly, tilting the lever 10, until the stand no longer grips the ground, but tends to trail along the ground, whereupon the spring 56 retracts the stand to the position shown in Fig. 1, where it will not interfere with the hitch.

A stand control rope 68, suitably anchored as at 70 to the tractor within easy reach of the operator seated thereon, is also connected as at 72 to the stand bracket 54, so that, by pulling the rope, the operator can overcome the opposition of the spring 56 and thereby swing the stand 42 into engagement with the ground as shown in dotted lines at 74 in Fig. 2. While the stand is held in such engagement, the tractor is backed up sufficiently to cause the pole 22 and hitch to also back up until the relative positions are as shown in full lines in Figs. 2 and 5, this backing up causing over-center movement of the mechanism 53. Thereupon the rope can be released and the hitch pin 18 can be removed if desired, and then the tractor may be simply driven away. If the tractor and trailer are hitched together and the stand 42 is in ground-engaging position and it is desired to disengage the stand from the ground, this may be accomplished simply by driving the tractor forward, as explained above.

Although the pivot connection at 34 between the lever 10 and the pole 22 allows the draw bar to descend independently of the pole, as when the rear end of the tractor enters a depression in the ground, the engagement of the rear of the lever 10 with the upper part of the pole 22 insures the movement of the pole as a unit upward with the draw bar when the rear end of the tractor is elevated abnormally, as by a rise in the terrain.

It is evident from the foregoing that we have provided a hitch which is of extremely simple construction and is adapted to accomplish the purposes for which it is provided.

Various modifications may suggest themselves to those skilled in the art without departing from the spirit of our invention and, hence, we do not wish to be restricted to the specific form shown or uses mentioned, except to the extent indicated in the appended claims, which are to be interpreted as broadly as the state of the art will permit.

We claim:

1. A device of the class described, comprising a trailer having a forward portion tending to rest on the ground, a stand pivotally supported by said trailer and having a free end swingable selectively away from or toward the ground to allow said portion to rest on the ground or to support said portion at an elevation, means for yieldably urging said end selectively toward portion-supporting position and an inoperative position out of engagement with the ground, a tractor, means detachably connecting said tractor to said portion of said trailer, a member operatively connected to said stand and operative by the operator while he is in driving position on the tractor to swing the free end of said stand from said inoperative disengaged position to an inoperative ground-engaging position, said stand while so engaged being swingable about said free end as a pivot in response to backing up of said tractor until said stand is in said portion-supporting position, and means for stopping said stand at the latter position, said stand being swingable back about its ground-engaging free end from said portion-supporting position to said disengaged inoperative position progressively in response to forward movement of said trailer by said tractor and by said urging means.

2. A device of the class described, comprising a trailer having a forward portion tending to rest on the ground, a stand pivotally supported by said trailer and having a free end swingable selectively away from or toward the ground to allow said portion to rest on the ground or to support said portion at an elevation, a tractor, means detachably connecting said tractor to said portion of said trailer, a member operatively connected to said stand and operative by the operator while he is in driving position on the tractor to swing the free end of said stand from an inoperative disengaged position to an inoperative ground-engaging position, said stand while so engaged being swingable about said free end as a pivot in response to backing up of said tractor until said stand is in said portion-supporting position, means for stopping said stand at the latter position, whereby said stand will support said portion of said trailer independently of said tractor, said stand being swingable back about its ground-engaging free end from said portion-supporting position to said inoperative ground-engaging position in response to forward movement of said trailer by said tractor, and means thereafter operative to return said stand to said inoperative disengaged position.

3. A device of the class described, comprising a trailer tending to rest on the ground at the forepart thereof, a tractor, means providing a vertically lost motion connection between said trailer and said tractor, a stand pivotally connected to said trailer and adapted to be substantially inclined forward and downward with a portion disposable in pivotal relation to the ground in a position to support the trailer independently of the tractor, means for yieldably holding said stand selectively in said position or extended rearward from its pivotal connection with said trailer in an inoperative position, and means operative by the operator seated on the tractor when said stand is in inoperative position for overcoming said yieldably holding means and moving said stand to a rearwardly and downwardly inclined position in pivotal relation to the ground, from which position said stand is thereafter pivotally movable relative to the ground to said forward position pursuant to rearward movement of said tractor, said stand being thereafter pivotally movable relative to the ground to inoperative position pursuant to forward movement of the tractor, said lost motion connection enabling said trailer to rise independently of said tractor upon such movement of said stand to inoperative position.

4. A device of the class described comprising a trailer having a hitching portion tending to gravitate to the ground, a tractor for said trailer, means pivotally connected to said trailer portion and having a part adapted to move pivotally relative to the ground so as to be movable toggle fashion selectively to a substantial extent to one or the other side of dead center relative to the respective pivot axes into or out of a position to prop said hitching portion to an elevation suitable for hitching to said tractor, means for preventing movement of said propping means from said propping position in a direction away from the opposite side of dead center, and means for hitching said trailer portion to said tractor, said propping means being at all times free to be moved by said trailer portion out of propping position pursuant merely to forward movement of said tractor without requiring further attention.

5. A device of the class described comprising a trailer having a hitching portion tending to gravitate to the ground, a tractor for said trailer, means pivotally connected to said trailer portion and having a part adapted to move pivotally relative to the ground so as to be movable toggle fashion selectively to a substantial extent to one or the other side of dead center relative to the respective pivot axes into or out of a position to prop said hitching portion to an elevation suitable for hitching to said tractor, means for preventing movement of said propping means from said propping position in a direction away from the opposite side of dead center, resilient means for yieldably resisting movement of said propping means from said propping position away from said tractor, and means for hitching said trailer portion to said tractor, said propping means being movable out of propping position pursuant to forward movement of said tractor notwithstanding said resilient means.

6. A device of the class described comprising a trailer having a hitching portion tending to gravitate to the ground, a tractor for said trailer, means pivotally connected to said trailer portion and having a part adapted to move pivotally relative to the ground so as to be movable toggle fashion selectively to a substantial extent to one or the other side of dead center relative to the respective pivot axes into or out of a position to prop said hitching portion to an elevation suitable for hitching to said tractor, means for preventing movement of said propping means from said propping position in a direction away from the opposite side of dead center, resilient means for yieldably resisting movement of said propping means from said propping position away from said tractor, means for hitching said trailer portion to said tractor, said propping means being movable out of propping position pursuant to forward movement of said tractor notwithstanding said resilient means, and means for adjusting the force of said resilient means.

7. A device of the class described comprising a trailer having a hitching portion tending to gravitate to the ground, a tractor for said trailer, means associated with said trailer portion and engageable with the ground in a position to prop said portion to an elevation suitable for hitching said tractor, means for preventing movement of said propping means from said propping position toward said tractor, means for hitching said trailer portion to said tractor, said propping means being movable out of propping position pursuant to forward movement of said tractor, and means automatically operative upon movement of said propping means out of propping position to move said propping means free of the ground so that said propping means will be unaffected by rearward movement of said tractor.

8. A device of the class described comprising a trailer having a hitching portion tending to gravitate to the ground, a tractor for said trailer, means associated with said trailer portion and engageable with the ground in a position to prop said portion to an elevation suitable for hitching said tractor, means for preventing movement of said propping means from said propping position toward said tractor, means for hitching said trailer portion to said tractor, said propping means being movable out of propping position pursuant to forward movement of said tractor, and spring means connected to said trailer portion and propping means and cooperative therewith to form a toggle joint, the connection of said spring means with said propping means, when said propping means is in propping position, being disposed on one side of dead center and, when said propping means is out of propping position, being disposed on the other side of dead center.

9. A device of the class described comprising a trailer having a hitching portion tending to gravitate to the ground, a tractor for said trailer, means pivotally connected to said trailer portion and having a part adapted to move pivotally relative to the ground so as to be movable toggle fashion selectively to a substantial extent to one or the other side of dead center relative to the respective pivot axes into or out of a position to prop said hitching portion to an elevation suitable for hitching to said tractor, means for preventing movement of said propping means from said propping position in a direction away from the opposite side of dead center, means for hitching said trailer portion to said tractor, said propping means being at all times free to be moved by said trailer portion out of propping position pursuant merely to forward movement of said tractor without requiring further attention, and spring means connected to said trailer portion and propping means and cooperative therewith to form a toggle joint, the connection of said spring means with said propping means, when said propping means is in propping position, being disposed on one side of dead center and, when said propping means is out of propping position, being disposed on the other side of dead center.

10. A device of the class described comprising a trailer having a hitching portion tending to gravitate to the ground, a tractor for said trailer, means pivotally connected to said trailer portion and having a part adapted to move pivotally relative to the ground so as to be movable toggle fashion selectively to a substantial extent to one or the other side of dead center relative to the respective pivot axes into or out of a position to prop said hitching portion to an elevation suitable for hitching to said tractor, means for preventing movement of said propping means from said propping position in a direction away from the opposite side of dead center, and means for hitching said trailer portion to said tractor, said propping means being at all times free to be moved by said trailer portion out of propping position pursuant merely to forward movement of said tractor without requiring further attention, said propping means, when out of propping position and in pivotal relation to the ground, being movable into propping position pursuant to rearward movement of said tractor.

11. A device of the class described comprising a trailer having a hitching portion tending to gravitate to the ground, a tractor for said trailer, means associated with said trailer portion and engageable with the ground in a position to prop said portion to an elevation suitable for hitching said tractor, means for preventing movement of said propping means from said propping position toward said tractor, means for hitching said trailer portion to said tractor, said propping means being movable out of propping position pursuant to forward movement of said tractor, said propping means, when out of propping position and in engagement with the ground, being movable into propping position pursuant to rearward movement of said tractor, and means enabling the driver seated on the tractor to firmly hold said propping means in engagement with the ground so as to enable said propping means to be moved into propping position when said tractor moves rearward.

12. A device of the class described comprising a trailer having a hitching portion tending to gravitate to the ground, a tractor for said trailer, means associated with said trailer portion and engageable with the ground in a position to prop said portion to an elevation suitable for hitching said tractor, means for preventing movement of said propping means from said propping position toward said tractor, and means for hitching said trailer portion to said tractor, said propping means being at all times free to be moved by said trailer portion out of propping position pursuant merely to forward movement of said tractor, without attention from the driver, said propping means, when out of propping position and in engagement with the ground, being movable by said trailer portion into propping position pursuant to rearward movement of said tractor, means actuated by the driver seated on said tractor for firmly holding said propping means in engagement with the ground so as to enable said propping means to be moved by said portion into propping position when said tractor moves rearward, spring means connected to said trailer portion and propping means and cooperative therewith to form a toggle joint, said propping means when in propping position being disposed on one side of dead center and, when out of propping position, being disposed on the other side of dead center.

13. A device of the class described comprising a trailer having a hitching portion tending to gravitate to the ground, a tractor for said trailer, means associated with said trailer portion and engageable with the ground in a position to prop said portion to an elevation suitable for hitching said tractor, means for preventing movement of said propping means from said propping position toward said tractor, and means for hitching said trailer portion to said tractor, said propping means being at all times free to be moved by said trailer portion out of propping position pursuant merely to forward movement of said tractor, without attention from the driver, said propping means, when out of propping position and in engagement with the ground, being movable by said trailer portion into propping position pursuant to rearward movement of said tractor, means actuated by the driver seated on said tractor for firmly holding said propping means in engagement with the ground so as to enable said propping means to be moved by said portion into propping position when said tractor moves rearward, spring means connected to said trailer portion and propping means and cooperative therewith to form a toggle joint, said propping means when in propping position being disposed on one side of dead center and, when out of propping position, being disposed on the other side of dead center, and means for adjusting the force of said spring means.

14. A device of the class described, comprising a front-heavy tiltable trailer, a tractor, means for hitching said trailer to said tractor, means for supporting the front of said trailer independently of said tractor, said supporting means being at all times free to be moved to an inoperative position in response merely to forward movement of said tractor, and means enabling the driver while seated on the tractor to move said supporting means to a position from which said supporting means is further movable to an operative position in response to rearward movement of said tractor.

15. A device of the class described, comprising a front-heavy tiltable trailer vehicle, a tractor vehicle, a link pivotally connected to said vehicles for transmitting horizontal movements of said tractor vehicle to said trailer vehicle and maintaining the front of said trailer vehicle off the ground, one of the pivot connections enabling said front of said trailer vehicle to rise independently of said tractor vehicle, and ground-engageable means carried by said trailer vehicle for supporting said front of said trailer vehicle independently of said tractor vehicle while said vehicles are linked together, said supporting means being movable initially toward ultimate supporting position, while said front of said trailer vehicle is supported by said tractor vehicle, and in response to rearward movement of said tractor vehicle, said supporting means being operative during further movement thereof, in response to further rearward movement of said tractor vehicle, to raise said front of said trailer vehicle independently of said tractor vehicle, one of said pivotal connections being on a substantially horizontal axis and the other pivotal connection being on a substantially vertical axis with lost vertical motion, said link having a free arm beyond said horizontal axis, said free arm being lapped with the vehicle to which said link is pivotally connected on a horizontal axis, whereby said arm by engagement with the last mentioned vehicle pursuant to the action of gravity on said front of said trailer vehicle prevents said front from dropping to the ground.

16. A device of the class described, comprising a front-heavy tiltable trailer vehicle, a tractor vehicle, a link pivotally connected to said vehicles for transmitting horizontal movements of said tractor vehicle to said trailer vehicle and maintaining the front of said trailer vehicle off the ground, one of the pivot connections enabling said front of said trailer vehicle to rise independently of said tractor vehicle, and ground-engageable means carried by said trailer vehicle for supporting said front of said trailer vehicle independently of said tractor vehicle while said vehicles are linked together, said supporting means being movable initially toward ultimate supporting position, while said front of said trailer vehicle is supported by said tractor vehicle, and in response to rearward movement of said tractor vehicle, said supporting means being operative during further movement thereof, in response to further rearward movement of said tractor vehicle, to raise said front of said trailer vehicle independently of said tractor vehicle, yieldable means for holding said supporting means in a position from which it is undisturbed by rearward movement of said tractor vehicle, and means enabling the driver seated on said tractor vehicle to firmly hold said supporting means in a position from which said supporting means is movable to said operative position.

17. A device of the class described, comprising a front-heavy tiltable trailer vehicle, a tractor vehicle, a link connected to one of said vehicles and pivotally connected to the other vehicle for transmitting horizontal movements of said tractor vehicle to said trailer vehicle and maintaining the front of said trailer vehicle off the ground, one of said connections enabling said front of said trailer vehicle to rise independently of said tractor vehicle, and ground engageable means carried by said trailer vehicle for supporting said front of said trailer vehicle independently of said tractor vehicle while said vehicles are linked together, said supporting means being movable initially toward ultimate supporting position, while said front of said trailer vehicle is supported by said tractor vehicle, and in response to rearward movement of said tractor vehicle, said supporting means being operative during further movement thereof, in response to further rearward movement of said tractor vehicle, to raise said front of said trailer vehicle independently of said tractor vehicle, yieldable means for holding said supporting means in a position from which it is undisturbed by rearward movement of said tractor vehicle, and means enabling the driver seated on said tractor vehicle to firmly hold said supporting means in a position from which said supporting means is movable to said operative position.

18. A device of the class described, comprising a front-heavy tiltable trailer vehicle, a tractor vehicle, a link connected to one of said vehicles and pivotally connected to the other vehicle for transmitting horizontal movements of said tractor vehicle to said trailer vehicle and maintaining the front of said trailer vehicle off the ground, one of said connections enabling said front of said trailer vehicle to rise independently of said tractor vehicle, and ground engageable means carried by said trailer vehicle for supporting said front of said trailer vehicle independently of said tractor vehicle while said vehicles are linked together, said supporting means being movable initially toward ultimate supporting positions, while said front of said trailer vehicle is supported by said tractor vehicle, and in response to rearward movement of said tractor vehicle, said supporting means being operative during further movement thereof, in response to further rearward movement of said tractor vehicle, to raise said front of said trailer vehicle independently of said tractor vehicle, said supporting means being movable to an inoperative position and causing the front of said trailer vehicle to rise independently of said tractor vehicle in response to forward movement of said tractor vehicle, without requiring at any time in connection with such movement of said supporting means to inoperative position any attention whatever of the driver seated on the tractor vehicle other than that of driving said tractor vehicle.

19. A device of the class described, comprising a front-heavy tiltable trailer vehicle, a tractor vehicle, a link connected to one of said vehicles and pivotally connected to the other vehicle for transmitting horizontal movements of said tractor vehicle to said trailer vehicle and maintaining the front of said trailer vehicle off the ground, one of said connections enabling said front of said trailer vehicle to rise independently of said tractor vehicle, and ground engageable means carried by said trailer vehicle for supporting said front of said trailer vehicle independently of said tractor vehicle while said vehicles are linked together, said supporting means being movable initially toward ultimate supporting position, while said front of said trailer vehicle is supported by said tractor vehicle, and in response to rearward movement of said tractor vehicle, said supporting means being operative during further movement thereof, in response to further rearward movement of said tractor vehicle, to raise said front of said trailer vehicle independently of said tractor vehicle, said supporting means being movable to an inoperative position and causing the front of said trailer vehicle to rise independently of said tractor vehicle in response to forward movement of said tractor vehicle, yieldable means for holding said supporting means in a position from which it is undisturbed by rearward movement of said tractor vehicle, and means enabling the driver seated on the tractor vehicle to firmly hold said supporting means in a position from which said supporting means is movable to said operative position, without requiring at any time in connection with such movement of said supporting means to inoperative position any attention whatever of the driver seated on said tractor vehicle other than that of driving said tractor vehicle.

WILLIAM L. ZINK.
VERNON O. HAUSWIRTH.